(12) United States Patent
Maaninen et al.

(10) Patent No.: US 9,781,418 B1
(45) Date of Patent: Oct. 3, 2017

(54) ADAPTIVE DEADZONE AND RATE-DISTORTION SKIP IN VIDEO PROCESSING

(75) Inventors: Juha Pekka Maaninen, Oulu (FI); Janne Salonen, Oulu (FI)

(73) Assignee: GOOGLE INC., Mountain View, CA (US)

(*) Notice: Subject to any disclaimer, the term of this patent is extended or adjusted under 35 U.S.C. 154(b) by 570 days.

(21) Appl. No.: 13/494,950

(22) Filed: Jun. 12, 2012

(51) Int. Cl.
| | |
|---|---|
| *H04N 19/102* | (2014.01) |
| *H04N 19/129* | (2014.01) |
| *H04N 19/10* | (2014.01) |
| *H04N 19/115* | (2014.01) |

(52) U.S. Cl.
CPC ......... *H04N 19/102* (2014.11); *H04N 19/129* (2014.11); *H04N 19/10* (2014.11); *H04N 19/115* (2014.11)

(58) Field of Classification Search
CPC .. H04N 7/50; H04N 7/26244; H04N 7/26271; H04N 19/00006; H04N 19/00169; H04N 19/00175; H04N 19/00133
USPC .................. 375/240, 240.01, 240.02, 240.03
See application file for complete search history.

(56) References Cited

U.S. PATENT DOCUMENTS

| | | | | |
|---|---|---|---|---|
| 5,570,197 A | * | 10/1996 | Boon ..................... | H04N 19/40 341/67 |
| 6,360,014 B1 | * | 3/2002 | Boon ................... | H04N 11/044 375/E7.027 |
| 6,912,255 B2 | | 6/2005 | Drezner et al. | |
| 7,418,147 B2 | | 8/2008 | Kamaci et al. | |
| 7,437,007 B1 | * | 10/2008 | Augustine et al. | ........... 382/235 |
| 8,121,188 B2 | | 2/2012 | Marpe et al. | |
| 8,126,054 B2 | | 2/2012 | Hsiang | |
| 8,135,068 B1 | | 3/2012 | Alvarez et al. | |
| 2003/0021344 A1 | * | 1/2003 | Panusopone | ......... H04N 19/523 375/240.16 |
| 2003/0120664 A1 | * | 6/2003 | Davidson | ................ H04L 69/12 |
| 2004/0028131 A1 | | 2/2004 | Ye et al. | |
| 2005/0201469 A1 | | 9/2005 | Sievers et al. | |
| 2005/0254719 A1 | | 11/2005 | Sullivan | |
| 2006/0182350 A1 | * | 8/2006 | Kondo | .................... H04N 19/98 382/232 |
| 2006/0239636 A1 | * | 10/2006 | Sugiyama | ............ H04N 9/7921 386/306 |

(Continued)

OTHER PUBLICATIONS

Mozilla, "Introduction to Video Coding," 171 pages.

(Continued)

*Primary Examiner* — Mohammed Rahaman
*Assistant Examiner* — Jimmy S Lee
(74) *Attorney, Agent, or Firm* — Young Basile Hanlon & MacFarlane, P.C.

(57) ABSTRACT

This disclosure relates to implementing an adaptive deadzone for one or more quantized coefficients in a quantized block. In particular, one or more candidate blocks with one or more coefficients and an end of block (EOB) indicator are generated. The one or more coefficients are a subset of the one or more quantized coefficients in the quantized block. A cost value for each of the one or more candidate blocks is calculated based at least in part on a rate value and a distortion value of the one or more coefficients in each of the one or more candidate blocks. Accordingly, a candidate block from the one or more candidate blocks with a lowest calculated cost value is selected as an output block.

19 Claims, 12 Drawing Sheets

— 600

$B0 = (EOB)\ 0\ 0\ \ldots\ 0\ 0\ 0$ $B1 = c_0\ (EOB)\ 0\ \ldots\ 0\ 0\ 0$ $B2 = c_0\ c_1\ (EOB)\ \ldots\ 0\ 0\ 0$ $\vdots$ $B14 = c_0\ c_1\ c_2\ \ldots\ c_{13}\ (EOB)\ 0$ $B15 = c_0\ c_1\ c_2\ \ldots\ c_{13}\ c_{14}\ (EOB)$ $B16 = c_0\ c_1\ c_2\ \ldots\ c_{13}\ c_{14}\ c_{15}$

(56) References Cited

U.S. PATENT DOCUMENTS

| | | | |
|---|---|---|---|
| 2007/0294245 | A1* | 12/2007 | van Baarsen ........ H04N 19/176 |
| 2007/0297517 | A1* | 12/2007 | Cho et al. ................ 375/240.23 |
| 2008/0056354 | A1 | 3/2008 | Sun et al. |
| 2008/0219573 | A1 | 9/2008 | Lu |
| 2008/0279466 | A1* | 11/2008 | Yang .................... H04N 19/176 382/246 |
| 2009/0010557 | A1* | 1/2009 | Zheng ................. H04N 19/139 382/239 |
| 2009/0196515 | A1 | 8/2009 | Kim et al. |
| 2010/0124284 | A1* | 5/2010 | Lee ..................... H04N 19/139 375/240.18 |
| 2010/0329345 | A1* | 12/2010 | Andersson et al. ..... 375/240.16 |
| 2011/0158315 | A1* | 6/2011 | Kim .................... H04N 19/124 375/240.03 |
| 2012/0166502 | A1* | 6/2012 | Chen .................... G06F 17/147 708/203 |

OTHER PUBLICATIONS

Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Overview; VP7 Data Format and Decoder. Version 1.5. On2 Technologies, IxNC. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, IxNC. Dated Aug. 17, 2006.
VP6 Bitstream & Decoder Specification. Version 1.03. On2 Technologies, IxNC. Dated Oct. 29, 2007.
VP8 Data Format and Decoding Guide. WebM Project. Google On2. Dated: Dec. 1, 2010.

* cited by examiner $B0 = (EOB)\ 0\ 0\ \ldots\ 0\ 0\ 0$ $B1 = c0\ (EOB)\ 0\ \ldots\ 0\ 0\ 0$ $B2 = c0\ c1\ (EOB)\ \ldots\ 0\ 0\ 0$ $\vdots$ $B14 = c0\ c1\ c2\ \ldots\ c13\ (EOB)\ 0$ $B15 = c0\ c1\ c2\ \ldots\ c13\ c14\ (EOB)$ $B16 = c0\ c1\ c2\ \ldots\ c13\ c14\ c15$

US 9,781,418 B1

ADAPTIVE DEADZONE AND RATE-DISTORTION SKIP IN VIDEO PROCESSING

TECHNICAL FIELD

This disclosure relates generally to video processing, and more specifically, to optimizing quantization for a coded block based on rate and distortion.

BACKGROUND

The amount of data representing media information, for example, a still image or a video image, can be extremely large. Further, transmitting digital video information over communication networks can consume large amounts of bandwidth. The cost of transmitting data from one location to another is a function of bit rate, e.g. the number of bits transmitted per second. Typically, higher bit transfer rates are associated with increased costs. Higher bit rates can also progressively increase the required storage capacities of memory systems, thereby increasing storage costs. Thus, for a given desired quality level, it can be more cost effective to use fewer bits than more bits to store digital images and videos. It is thus desirable to compress media data for recording, transmitting, or storing.

In a typical compression scheme, achieving higher media quality requires usage of more bits, which can increase the cost of transmission and storage. The devices typically associated with compression include the encoder, decoder and codec. An encoder is a device capable of encoding (e.g., coding) (and sometimes decoding) digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Generally speaking, for example, codec classifications include discrete cosine transfer (DCT) codecs, fractal codecs, and wavelet codecs. An encoder or codec, by encoding the digital media data, can reduce the number of bits required to transmit signals thereby reducing associated transmission costs.

DCT coefficients can be used by an encoder to transform an image frame from a spatial domain to a frequency domain. The DCT coefficients can represent quantized data (e.g., compressed data) for the image frame. Conventional DCT encoders can implement quantization of coefficients based on a rate-distortion ratio of the coefficients. For example, conventional DCT encoders can implement integer division to determine rate-distortion ratios of the coefficients. However, integer division is suboptimal for data compression efficiency. Moreover, a decision between skipping a macroblock (e.g., forcing all coefficients in the macroblock to zero) and encoding singular coefficients without considering effects of transformation and/or quantization can result in suboptimal compression efficiency and/or video quality.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a candidate component, a computation component and a selector component. The candidate component generates one or more candidate blocks with one or more coefficients and an end of block (EOB) indicator. The one or more coefficients are a subset of one or more quantized coefficients in a quantized block. The computation component calculates a cost value for each of the one or more candidate blocks based at least in part on a rate value and a distortion value of the one or more coefficients in each of the one or more candidate blocks. The selector component selects a candidate block from the one or more candidate blocks with a lowest calculated cost value as an output block.

Additionally, a non-limiting implementation provides for generating one or more candidate blocks with one or more coefficients and an end of block (EOB) indicator, calculating a cost value for each of the one or more candidate blocks based at least in part on a rate value and a distortion value of the one or more coefficients in each of the one or more candidate blocks, and selecting a candidate block from the one or more candidate blocks with a lowest calculated cost value as an output block. The one or more coefficients are a subset of one or more quantized coefficients in a quantized block.

Furthermore, another non-limiting implementation provides for receiving one or more quantized coefficients and an end of block (EOB) indicator from a bitstream, dequantizing one or more of the one or more quantized coefficients before the EOB indicator, and setting one or more of the one or more quantized coefficients after the EOB indicator to zero. A location of the EOB indicator provides a lowest cost value for a candidate block.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
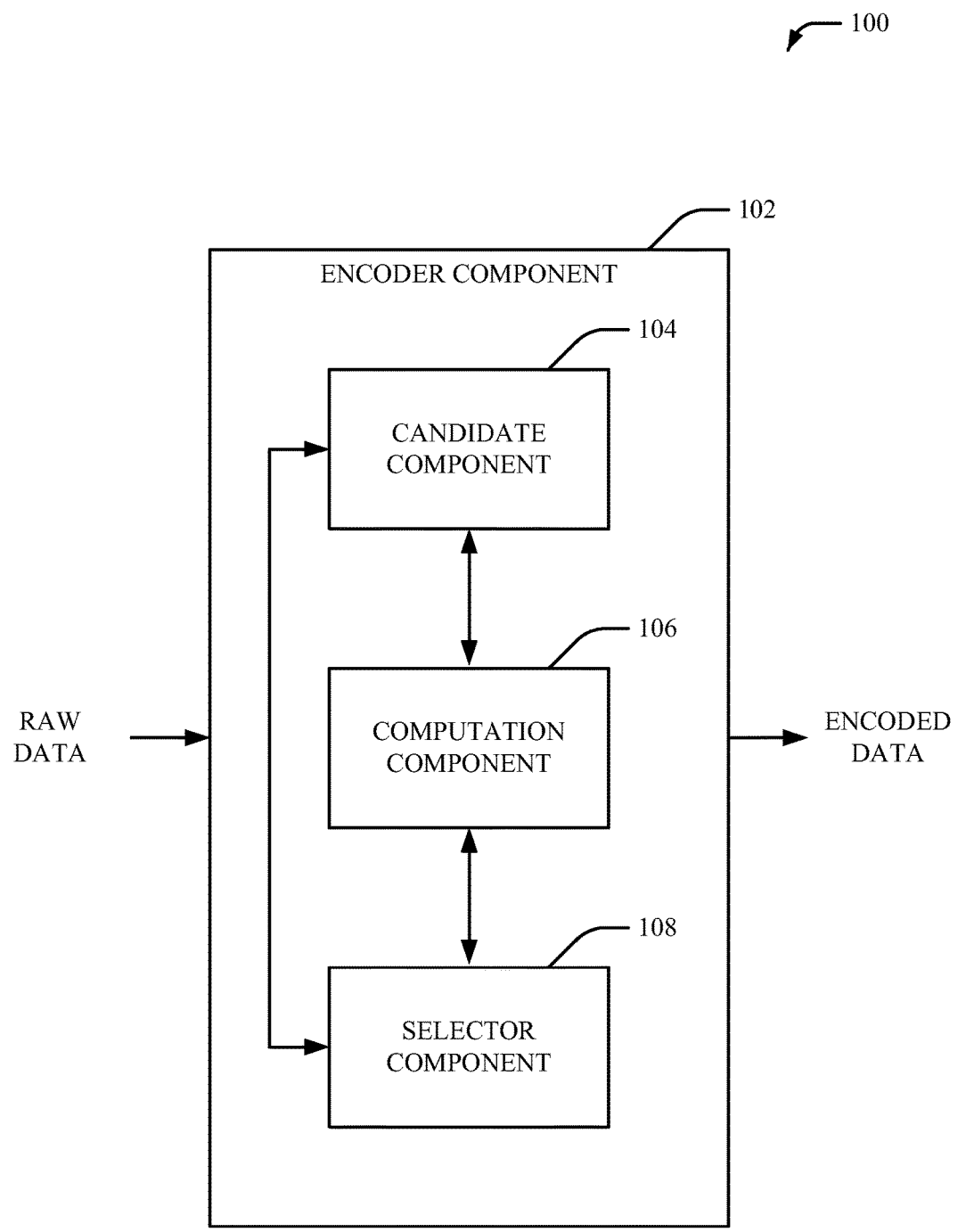
FIG. 1 illustrates a high-level block diagram of an example encoder component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of data representing media information can be extremely large. Further, transmitting digital video information over communication networks can consume large amounts of bandwidth. The cost of transmitting data from one location to another can be a function of number of bits transmitted per second. Typically, higher bit transfer rates are associated with progressively increased costs. Higher bit rates also can progressively add to required storage capacities of memory systems, which can thereby increase storage cost. Thus, at a given quality level, it can be more cost effective to use fewer bits, as opposed to more bits, to store digital images and videos. It is therefore desirable to compress media data for recording, transmitting, or storing.

A codec is a device capable of encoding (e.g., coding) and/or decoding digital media data. Encoding digital media data can involve compressing the digital media data, and decoding of encoded digital media data can involve decompressing the encoded digital media data.

Certain video compression schemes use DCT coefficients as part of the encoding process to facilitate encoding video content (e.g., compressing video data). An encoder, implementing DCT coefficients, can use the DCT coefficients to perform quantization of image frame data. This can make the encoding process and decoding process more efficient in many situations. For video compression schemes that use DCT coefficients for data quantization, the number of quantized coefficients can make up a significant portion of compressed data. Therefore, improving the efficiency of data quantization can be desirable to improve the overall efficiency of video compression.

However, conventional codecs may inefficiently encode DCT coefficients and/or may encode unnecessary DCT coefficients (e.g., DCT coefficients that do not improve image frame quality). As a result, conventional encoding techniques may use an undesirable number of bits (e.g., may use more bits than necessary) to encode a block, which can undesirably increase the cost of transmission and storage of the video. Further, compression efficiency may be undesirably (e.g., negatively) affected.

To that end, techniques for efficient encoding and decoding of video content are presented. Systems and methods disclosed herein relate to implementing an adaptive deadzone (e.g., an adjustable region of zero-valued coefficients in a quantized image frame). Accordingly, the amount of encoded media data can be reduced (e.g., compressibility of a video sequence can be increased) by evaluating individual coefficients and determining how much each individual coefficient contributes to reducing distortion of an image block.

Referring initially to FIG. 1, there is illustrated an example system 100 that optimizes coefficient quantization for an image block in an encoding pipeline based on rate and distortion, according to an aspect of this disclosure. For example, the system 100 can select an end of block (EOB) token location within a block based on a rate-distortion cost value of the block. Specifically, the system 100 can provide an encoder with a candidate feature (e.g., candidate component 104), a computation feature (e.g., computation component 106) and a selector feature (e.g., selector component 108). The candidate feature can generate one or more candidates (e.g., candidate output blocks) of an input block (e.g., a quantized block with one or more DCT quantized coefficients). Each of the candidates can include one or more coefficients and an EOB token located in a different position in the candidate. All coefficients before the EOB token can be encoded. All coefficients after the EOB token can be set to zero (e.g., not encoded). As such, each of the candidates can include a different number of non-zero coefficients (e.g., encoded coefficients).

The computation feature can calculate rate and/or distortion values for each of the coefficients. Based on the rate and/or distortion values, a total cost value can be calculated for each candidate (e.g., for different EOB token positions within a block). As such, it can be determined how much a particular coefficient improves visual quality of an image block. The selector feature can select a candidate with a lowest (e.g., best) rate-distortion cost as an output block (e.g., an encoded block). As such, the best EOB token position (e.g., optimal EOB token position) for the image block can be determined. Accordingly, unnecessary data (e.g., data that is costlier than the visual improvement offered) can be removed from the image block (e.g., unnecessary coefficients are not encoded). The system 100 can be employed by various systems, such as, but not limited to, image and video capturing systems, media player systems, televisions, mobile phones, tablets, personal data assistants, gaming systems, computing devices, and the like. In one example, the system 100 is implemented on an application specific integrated chip (ASIC). In another example, the system 100 is implemented on a system on a chip (SOC). In yet another example, the system 100 can be implemented in specialized hardware (e.g., a specialized processor, a hardware accelerator, an application processor, etc.) that is separate from a central processing unit (CPU).

In particular, the system 100 can include an encoder component 102. In FIG. 1, the encoder component 102 includes the candidate component 104, the computation component 106 and the selector component 108. In one example, the candidate component 104, the computation component 106 and the selector component 108 (e.g., the encoder component 102) can be implemented as adaptive deadzone logic. The encoder component 102 can receive one or more image frames (e.g., RAW DATA indicated in FIG. 1). In one example, the one or more image frames can be an input video signal represented as a series of video frames. The one or more image frames can be divided into blocks (e.g., square subblocks of pixels, a set of pixels, etc.). For example, each of the blocks can be a 4×4 block of pixels. Image data for the blocks can be transformed into a quantized block with one or more coefficients (e.g., quantized coefficients, DCT coefficients, etc.). For example, the quantized block can be a 4×4 block with 16 quantized coefficients. The one or more quantized coefficients can be calculated using a quantization mechanism in an encoding pipeline. In one example, the one or more quantized coefficients can be calculated using a Trellis quantization algorithm. In another example, the one or more quantized coefficients can be calculated using static division. In yet another example, the one or more quantized coefficients can be calculated using integer division.

The candidate component 104 can generate one or more candidate blocks (e.g., one or more potential blocks, one or more potential output blocks). The one or more candidate blocks can include one or more coefficients (e.g., DCT coefficients, quantized coefficients) and an end of block (EOB) indicator (e.g., EOB codeword, EOB token, etc.). The one or more coefficients can be a subset of one or more quantized coefficients in the quantized block (e.g., original coefficients from the input block). The one or more candidate blocks can be stored in one or more buffers.

Each of the candidate blocks can include a single EOB indicator. The EOB indicator can be located in a different position in each of the candidate blocks. In each candidate block, the EOB indicator can replace a particular coefficient with a value equal to "1". For example, the EOB indicator can replace a coefficient with a +1 value or a −1 value. As such, a coefficient in each candidate block with a value equal to "1" can be decimated (e.g., set to zero), and all other coefficients after the coefficient with a value equal to "1" can also be set to zero. The EOB indicator in each of the candidate blocks can be located after a non-zero coefficient. As such, each of the candidate blocks can represent a block with a different "1" coefficient value set to zero (e.g., a different "1" coefficient value that is replaced by the EOB indicator). It is to be appreciated that the EOB indicator can replace a coefficient with a value other than +1 or −1. In one example, the EOB indicator can replace a particular coefficient with a value equal to +2 or −2. In another example, the EOB indicator can replace a particular coefficient with a value equal to +1, −1, +2 or −2.

The computation component 106 can calculate a cost value for each of the candidate blocks based at least in part on a rate value and/or a distortion value (e.g., rate metrics and/or distortion metrics) of the one or more coefficients in each of the candidate blocks. As such, the computation component 106 can calculate rate and/or distortion metrics for different EOB positions (e.g., one or more candidate blocks with different EOB positions). The rate metrics (e.g., rate values) can be fetched (e.g., read) from one or more rate lookup tables. For example, the one or more rate lookup tables can be stored in a component separate from the encoder component 102 (to be described in more detail in FIG. 2). The rate values can be utilized by the processing component without additional processing (e.g., the rate values can be calculated by the component separate from the encoder component 102). The computation component 106 can also calculate the distortion values for each coefficient in a candidate block (e.g., for various EOB positions within an image block). For example, distortion can be calculated for a coefficient using the following equation:

Distortion=$((|C|-Q*D)^2)$, where C is the input coefficient value, Q is the absolute value of the quantized coefficient, and D is the dequantizer for the coefficient. For a zero quantized coefficient, Distortion=$(C^2)$.

Additionally, the computation component 106 can calculate the cost (e.g., the total coefficient cost) for each candidate block. For example, cost can be calculated using the following equation:

Cost=$R*M+D$, where R is the total rate value accumulated from a lookup table, M is a rate multiplier, and D is the calculated distortion. The total rate value R and/or the rate multiplier M can be read from a rate table. As such, the cost for a candidate block can be calculated based on rate and distortion of individual coefficients within the candidate block.

The selector component 108 can select a candidate block from the candidate blocks with a lowest calculated cost value as an output block (e.g., a selected block, an encoded block, etc.). As such, the selector component 108 can determine an optimal EOB indicator position (e.g., an optimal location for the EOB indicator within a block) based on a rate value and a distortion value of individual coefficients in a candidate block (e.g., the selector component 108 can choose an EOB position based on the calculated cost). The selector component can encode one or more of the coefficients before the optimal EOB indicator position. The selector component 108 can also set one or more coefficients (e.g., all coefficients) after the optimal EOB indicator position to zero. Therefore, one or more coefficients which fall below a given rate/distortion limiter can be decimated (e.g., set to zero). In one implementation, the computation component 106 can calculate a cost value for the quantized block based at least in part on a rate value and a distortion value of the one or more quantized coefficients in the quantized block. The selector component 108 can select the quantized block as the output block in response to a determination that the cost value for the quantized block is lower than a cost value of the selected candidate block. Alternatively, the selector component 108 can select the selected candidate block as the output block in response to a determination that the cost value for the quantized block is higher than a cost value of the selected candidate block.

Other blocks in a macroblock and/or in a different macroblock can be processed after selecting an output block, in accordance with various aspects and implementations described herein. For example, an EOB position for other 4×4 blocks in a macroblock can be determined. Additionally, an EOB position for blocks in other macroblocks in an image frame can be determined. Using this process, the encoder component 102 can generate (or be configured to generate) one or more encoded blocks and/or image frames (e.g., ENCODED DATA indicated in FIG. 1).

While FIG. 1 depicts separate components in system 100, it is to be appreciated that the components may be implemented in a common component. For example, the candidate component 104, the computation component 106 and/or the selector component 108 can be included in a single component. Further, it can be appreciated that the design of system 100 can include other component selections, component placements, etc., to implement an adaptive deadzone for a quantized block. In one example, the candidate component 104, the computation component 106 and the selector component 108 can be implemented on an ASIC chipset. In another example, the candidate component 104, the computation component 106 and the selector component 108 can be implemented on a SOC. The candidate component 104, the computation component 106 and the selector component 108 can be implemented as hardware and/or software. In one example, the candidate component 104, the computation component 106 and/or the selector component 108 can be implemented as machine-executable component(s) embodied within machine(s), e.g., embodied in one or more computer readable mediums (or media) associated with one or more machines. Such component(s), when executed by the one or more machines, e.g., computer(s), computing device(s), etc. can cause the machine(s) to perform the operations described herein.

Figure 2:
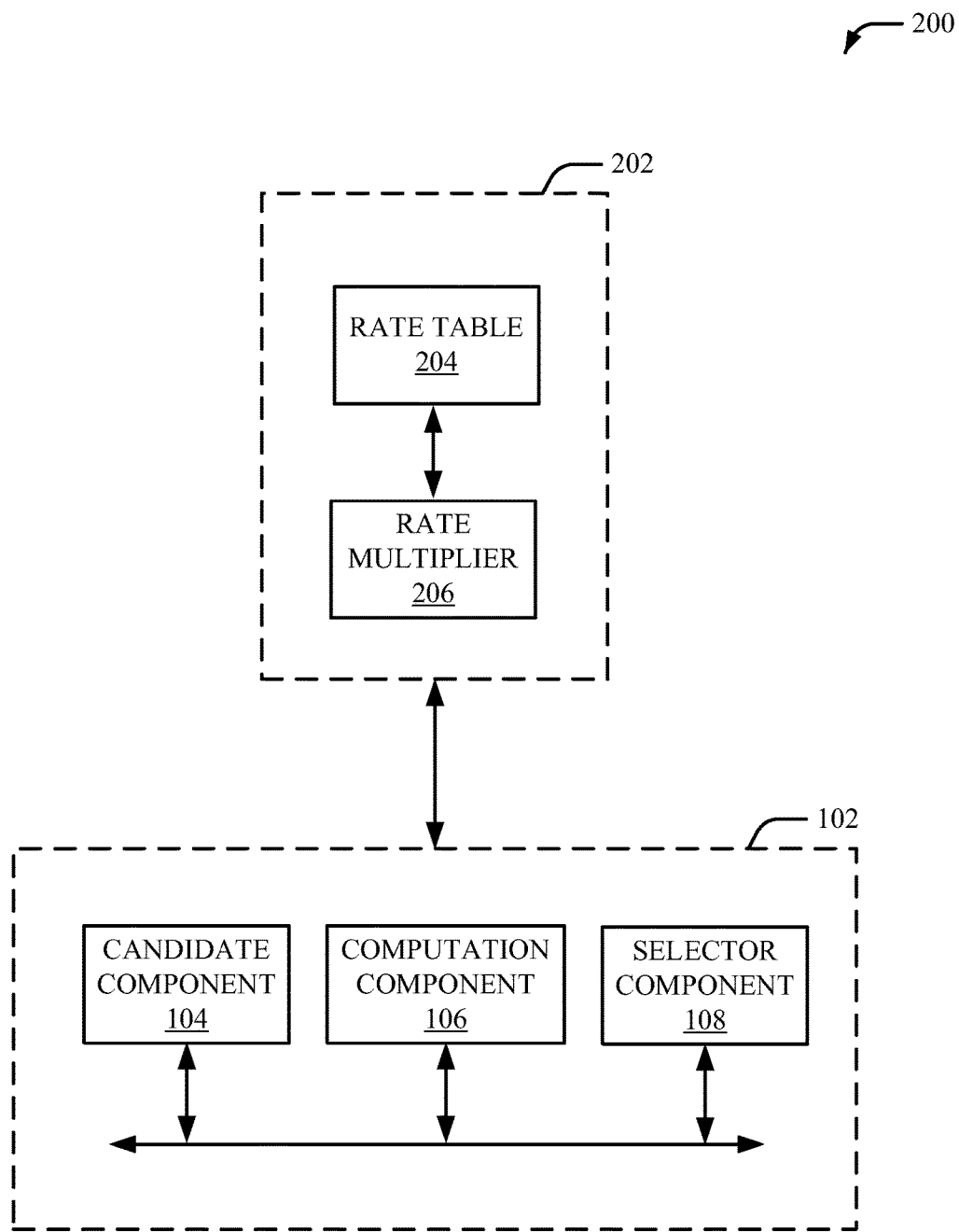
FIG. 2 illustrates a block diagram of an example encoder system, in accordance with various aspects and implementations described herein.

Referring to FIG. 2, there is illustrated an encoder system 200, according to an aspect of the subject disclosure. The encoder system 200 includes the encoder component 102 and a component 202. The encoder component 102 includes the candidate component 104, the computation component 106 and the selector component 108. In one example, the encoder component 102 can be implemented as a hardware component. For example, the encoder component 102 can be implemented on specialized hardware, an ASIC, a SOC, etc. The component 202 includes a rate table 204 and a rate multiplier 206. The component 202 can be implemented separate from the encoder component 102. In one example, the component 202 can be implemented as a software component (e.g., a software partition on a component separate from the encoder component 102). In another example, the component 202 can be implemented as a controller (e.g., a microcontroller). In yet another example, the component 202 can be implemented in a general purpose processor. The component 202 can generate one or more inputs for the encoder component 102. For example, the component 202 can provide rate values and/or rate multipliers via a software/hardware interface.

The rate table 204 can include (e.g., store) one or more rate values. Values from the rate table 204 can be presented to the encoder component 102 in a frame header. Accordingly, the encoder component 102 can use the rate values to calculate cost for each coefficient. The rate table 204 can implement entropy coding of coefficients using tree coding. Each rate value can be calculated from a respective coding tree (e.g., a coefficient coding tree).

The rate table 204 can present coefficient rate values and/or EOB rate values to the encoder component 102. The coefficient rate values can be organized into a coefficient rate signal. The coefficient rate signal can include plane data, band data, context data and/or token data. Similarly, the EOB rate values can be organized into an EOB rate signal. The EOB rate signal can include plane data, band data and/or context data.

In an example pseudo-code, coefficient rate values can be generated as follows:

```
for( plane = 0 ; plane < 4 ; ++plane ) {
  for( band = 0 ; band < 8 ; ++band ) {
    for( ctx = 0 ; ctx < 3 ; ++ctx ) {
      for( coeff = 0 ; coeff < 2 ; ++coeff ) {
        int rate;
        int *prob = coeffProbs[plane][band][ctx];
        tree *tree = ctx ? dctTree : dctTreeNoEOB;
        rate = RateTree( &tree[coeff ? DCT_ONE : DCT_ZERO], prob
);
        rate = (rate+8)>>4;
        if( rate == 0 ) rate++;
        if( coeff) rate += 16; /* sign bit */
        if( rate > 255 ) rate = 255;
        DzCoeffRate[plane][band][ctx][coeff] = rate;
      }
    }
  }
}
```

In an example pseudo-code, EOB rate values can be generated as follows:

```
for(plane=0; plane <4; ++plane) {
  for(band=0; band <8; ++band) {
    for(ctx=0; ctx <2; ++ctx) {
      int rate;
      int *prob=coeffProbs[plane][band][ctx+1];
      rate=RateTree(&dctTree[DCT_EOB], prob);
      rate=(rate+8)>>4;
      if(rate==0) rate++;
      else if(rate >255) rate=255;
      DzEobRate[plane][band][ctx]=rate;
    }
  }
}
```

The rate multiplier 206 can calculate a rate multiplier based on a squared DC coefficient dequantizer. For example, the multiplier can be calculated using the following equation:

Multiplier=0.115*Q*Q, where Q is the dequantizer for the DC coefficient of the block. The rate multiplier value can be rounded to a nearest integer before presenting the rate multiplier value to the encoder component 102.

Figure 3:
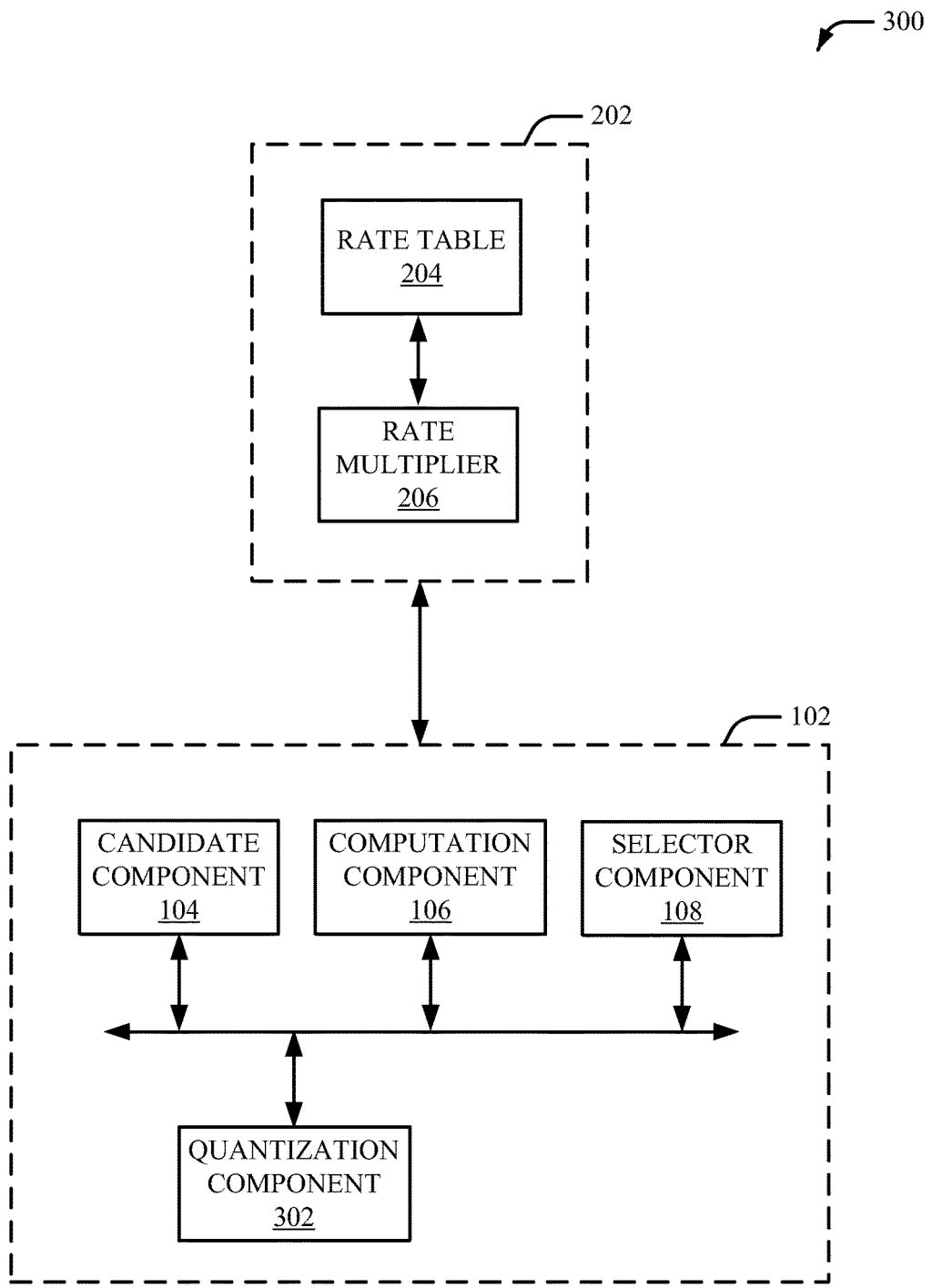
FIG. 3 illustrates a block diagram of a quantization component in an example encoder system, in accordance with various aspects and implementations described herein.

Referring to FIG. 3, there is illustrated an encoder system 300, according to an aspect of the subject disclosure. The encoder system 300 includes the encoder component 102 and the component 202. The encoder component includes the candidate component 104, the computation component 106, the selector component 108 and the quantization component 302.

The quantization component 302 can quantize one or more coefficients in an input block (e.g., an image frame subblock). In one example, the quantization component can implement Trellis quantization to quantize the one or more coefficients in the input block. In another example, the quantization component can implement static division to quantize the one or more coefficients in the input block. In yet another example, the quantization component can implement integer division to quantize the one or more coefficients in the input block. However, it is to be appreciated that a different type of quantization technique can be implemented to quantize the one or more coefficients in the input block.

In an example pseudo-code, quantization can be implemented as follows:

```
for each coefficient in block
{
  quantized_coeff=coefficient/quantizer;
  dequantized_coeff=quantized_coeff*dequantizer;
}
```

Figure 4:
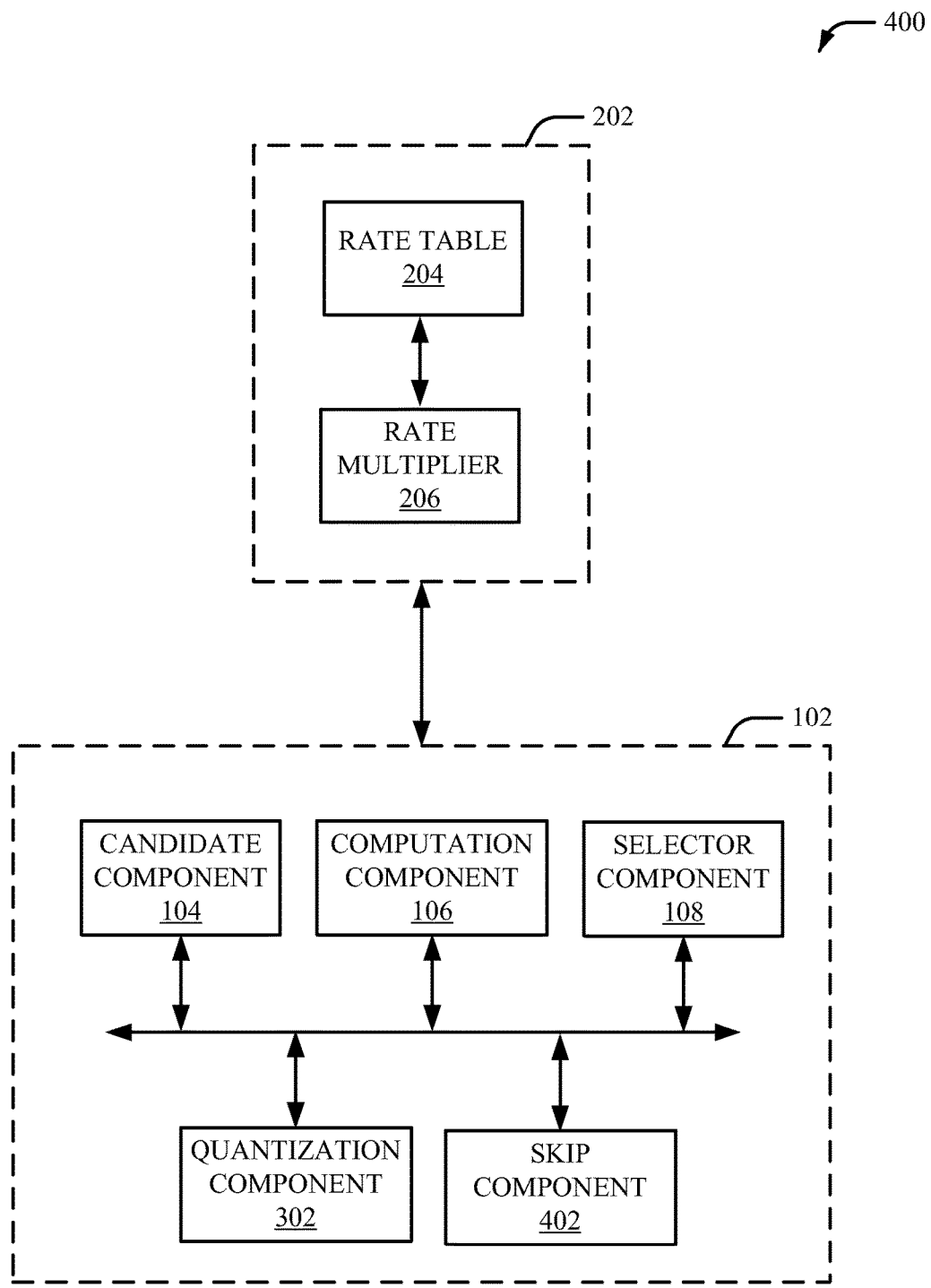
FIG. 4 illustrates a block diagram of a skip component in an example encoder system, in accordance with various aspects and implementations described herein.

Referring to FIG. 4, there is illustrated an encoder system 400, according to an aspect of the subject disclosure. The encoder system 400 includes the encoder component 102 and the component 202. The encoder component includes the candidate component 104, the computation component 106, the selector component 108, the quantization component 302 and a skip component 402.

The skip component 402 can determine if a macroblock includes only zero-valued coefficients (e.g., no non-zero coefficients). For example, a macroblock header can contain an element to signal that the macroblock includes only zero-valued coefficients. The skip component 402 can also calculate a rate value and a distortion value for a scenario when an entire macroblock is skipped (e.g., not encoded). For example, the skip component 402 can determine whether to skip a macroblock with only "0" and/or "1" valued coefficients. After every block in a macroblock has been quantized, the skip component 402 can determine whether to skip the macroblock or to not skip the macroblock. The skip component 402 can calculate a final rate-distortion cost (e.g. a total cost) for every block in a macroblock (e.g., accumulate the cost value for each block). Additionally, the skip component 402 can calculate (e.g., accumulate) distortion for skipped blocks for every block in a macroblock.

The skip component 402 can determine a skip cost value for not encoding a macroblock based at least in part on an accumulated distortion for an image frame introduced by skipping an entire macroblock. The skip component 402 can skip a macroblock (e.g., not encode a macroblock) in response to a determination that the skip cost value is smaller than a threshold level (e.g., a threshold value). For example, the threshold level can be based at least in part on the calculated total cost and a coefficient skip rate value. However, the skip component can encode a macroblock in response to a determination that the macroblock skip cost value is larger than the threshold level. As such, the skip component 402 can optimize a macroblock skip decision based on rate and distortion values.

The skip component 402 can implement a macroblock level flag. For example, the macroblock level flag can indicate whether a block is valid for a skip. The macroblock level flag can be persisted to successive blocks (e.g., 4×4 blocks) of the macroblock. Additionally, the skip component 402 can implement one or more counters. For example, the skip component 402 can implement two counters. The counters can be initialized to zero at the beginning of every macroblock (e.g., at a macroblock start position). The counters can also be persisted over successive blocks of the macroblock. At a macroblock boundary (e.g., at a new macroblock), the counters can be initialized.

After quantizing each block, the skip component 402 can determine if all coefficient values in a block are a 0 value or a 1 value (e.g., +1 or −1). If the macroblock contains all 0 or 1 coefficients, the macroblock level flag can be set (e.g., set equal to '1'). If not, the macroblock level flag is not set (e.g., set equal to '0'). If the macroblock level flag is set, the rate and distortion cost for the skipped macroblock can be calculated.

Figure 5:
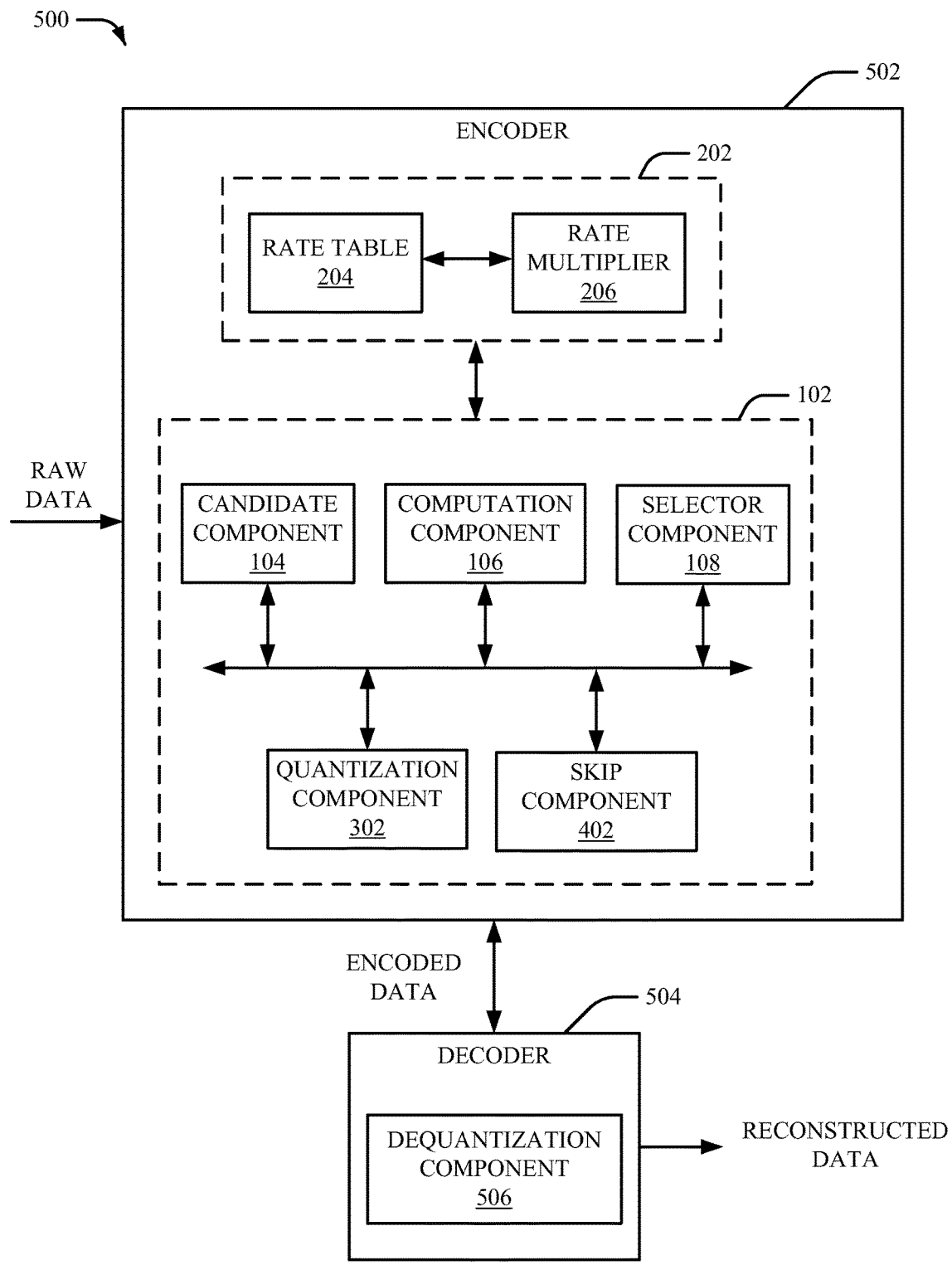
FIG. 5 illustrates block diagram of an example codec system, in accordance with various aspects and implementations described herein.

Referring to FIG. 5, there is illustrated an example codec system 500, according to an aspect of the subject disclosure. The codec system 500 can implement an adaptive deadzone technique and/or a skip decision to efficiently encode and/or decode a video frame of a video frame sequence in accordance with various aspects and implementations described herein. The system 500 includes an encoder 502 and a decoder 504. The encoder 502 includes the encoder component 102 and the component 202. The decoder 504 includes a dequantization component 506. The encoder component 102 can receive raw data (e.g., RAW DATA indicated in FIG. 5), such as raw video frames of a video frame sequence, and can encode blocks of raw video frames to generate encoded video frames. For example, to facilitate efficiently encoding a current block of a current video frame, the encoder 502 (e.g., via the encoder component 102 and/or the component 202) can determine an optimal location for the EOB indicator within a block. Accordingly, the encoder 502 can quantize one or more coefficients of an input block, calculate rate metrics, calculate distortion metrics and determine a best EOB indicator position for a block, as more fully disclosed herein.

The decoder can be implemented in a decoding pipeline. The decoder 504 (e.g., via a dequantization component 506) can receive encoded data (e.g., ENCODED DATA indicated in FIG. 5) from the encoder component 102. For example, the decoder 504 (e.g., the dequantization component 506) can receive one or more quantized coefficients and/or the EOB indicator, representing at least a portion of an encoded video frame, from the encoder 502. The location of the EOB indicator (e.g., the location of the EOB indicator within a candidate block) can provide a lowest cost value for a candidate block (e.g., a predictor block). The dequantization component 506 can dequantize the one or more coefficients up to the EOB indicator position. The dequantization component 506 can also reset one or more coefficients (e.g., all coefficients) after the EOB indicator to zero. The dequantization component 506 can multiply each of the one or more coefficients before the EOB indicator position by a dequantization factor. As such, the decoder 504 can generate decoded image frame data (e.g., RECONSTRUCTED DATA identified in FIG. 5).

Figure 6:
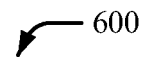
FIG. 6 illustrates example candidate blocks with different end of block (EOB) token locations, in accordance with various aspects and implementations of this disclosure.

Referring to FIG. 6, there is illustrated a candidate system 600, according to an aspect of the subject disclosure. In the non-limiting implementation shown in FIG. 6, 17 candidate blocks (e.g., potential output blocks) B0-B16 are generated. Each of the candidate blocks B0-B16 can be stored in a buffer. Candidate block B0 includes an EOB indicator that replaces the first coefficient c0 in the candidate block B0, candidate block B1 includes an EOB indicator that replaces the second coefficient c1 in the candidate block B1, candidate block B2 includes an EOB indicator that replaces the third coefficient c2 in the candidate block B2, etc. Candidate block B16 does not include an EOB indicator (e.g., all coefficients in the candidate block B16 can be encoded). The EOB indicator replaces (e.g., decimates) a coefficient with a value equal to +1 or −1. For example, the coefficient c14 in the candidate block B14 can be a +1 coefficient or a −1 coefficient. However, it to be appreciated that in an alternate implementation the EOB indicator can replace a coefficient with a value other than +1 or −1. For example, the EOB indicator can replace a coefficient with a value equal to +2 or −2. In another example, the EOB indicator can replace a coefficient with a value equal to +1, −1, +2 or −2. Furthermore, the EOB indicator is located after a non-zero coefficient in each of the candidate blocks. For example, the coefficient c13 is a non-zero coefficient in the candidate block B14. Additionally, in an example implementation, if the input block (e.g., quantized block) matches a candidate block Bj for some j, candidate blocks Bj+1, Bj+2, etc. are not generated and/or are considered invalid candidate blocks. An invalid candidate block can be a candidate block that is not processed by the computation component 106 (e.g., a cost value is not calculated for an invalid candidate block). For example, if the input block includes an EOB indicator in the third coefficient position (e.g., c2), then subsequent candidate blocks B3-B16 are not generated and/or are considered invalid candidate blocks. In addition, in an example implementation, a candidate block Bi for some i is not generated and/or is considered an invalid candidate block if any of the coefficients j>i have a value larger than +1 or −1. For example, for the candidate block B2, if one or more of the coefficients c3-c15 have a value larger than +1 or −1, the candidate block B2 is not generated and/or is considered an invalid candidate block.

The rate and distortion for each of the coefficients (e.g., c0-c15) can be calculated. Therefore, a cost value based on the rate and the calculated distortion can be calculated for each block (e.g., each EOB indicator location). For example, coefficients c0 and c1 can be used to calculate the cost value for the candidate block B2 and the rate generated by the rate value of the EOB indicator can be accumulated. In another example, the coefficients c0-c13 can be used to calculate cost for the candidate block B14 and the rate generated by the rate value of the EOB indicator can be accumulated. In yet another example, the coefficients c0-c15 can be used to calculate cost for the candidate block B16 without accumulating the rate value of the EOB indicator. The candidate block (e.g., a particular one of the candidate blocks B0-B16) that produces the lowest rate-distortion cost can be chosen as the output block (e.g., the encoded block, the block presented to the decoder 504, etc.).

While implementations and aspects of this disclosure are described herein with regard to blocks, this disclosure is not so limited. For example, the implementations and aspects disclosed herein in relation to blocks can be used (e.g., applied) in relation to various types of units or regions of a video frame, such as, for example, macroblocks, sub-macroblocks, coding units, motion granularity units, partitions, and/or other types of image compression units, and these various types of image compression units are within the scope of this disclosure.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media. The storage media can include non-transitory memory devices, e.g., memory devices that are used for long term persistent storage. Examples of non-transitory memory devices include random access memory, hard disks and flash memory devices.

Figure 7:
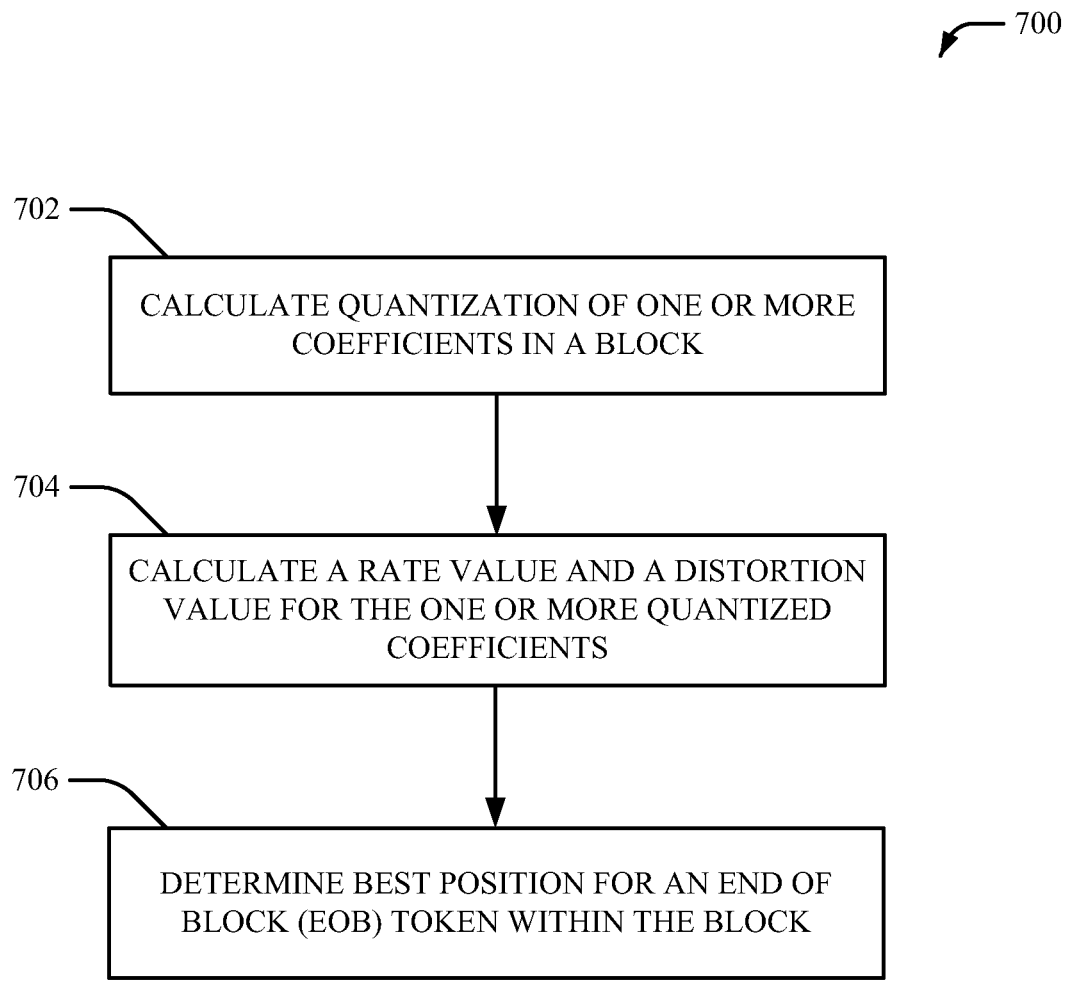
FIG. 7 depicts a flow diagram of an example method for implementing an adaptive deadzone for an image block, in accordance with various aspects and implementations described herein.

Referring to FIG. 7, there illustrated is a methodology 700 for finding a best position for an end of block (EOB) token (e.g., a position for the EOB token with a lowest cost) within an image block, according to an aspect of this disclosure. As an example, methodology 700 can be utilized in various codec applications, such as, but not limited to, media capturing systems, media displaying systems, computing devices, mobile phones, tablets, personal data assistants (PDAs), laptops, personal computers, audio/video devices, etc. Moreover, the methodology 700 can generate one or more candidate blocks from an input block. Specifically, the methodology 700 can generate one or more candidate output blocks, each with different EOB positions, for an input block and can select a candidate output block with a best EOB position as an output block.

Initially, video information can be captured or can be contained within memory (e.g., within a buffer). At 702, quantization of one or more coefficients in a block can be calculated (e.g., using a quantization component 302). For example, one or more coefficients of an input block (e.g., an image frame block) can be converted into one or more quantized coefficients (e.g., DCT coefficients). At 704, a rate value and a distortion value for the one or more quantized coefficients can be calculated (e.g., using a computation component 106). For example, a rate value for each quantized coefficient can be read from a rate table. Additionally, a distortion value for each coefficient can be calculated. At 706, a best position for an end of block (EOB) token within the block can be determined (e.g., using a selector component 108). For example, a cost value for a candidate block with a particular EOB token position in the candidate block can be calculated. Accordingly, a candidate block with a lowest overall rate-distortion cost can be determined. The candidate block with the lowest overall rate-distortion cost can be selected as an output block.

Figure 8:
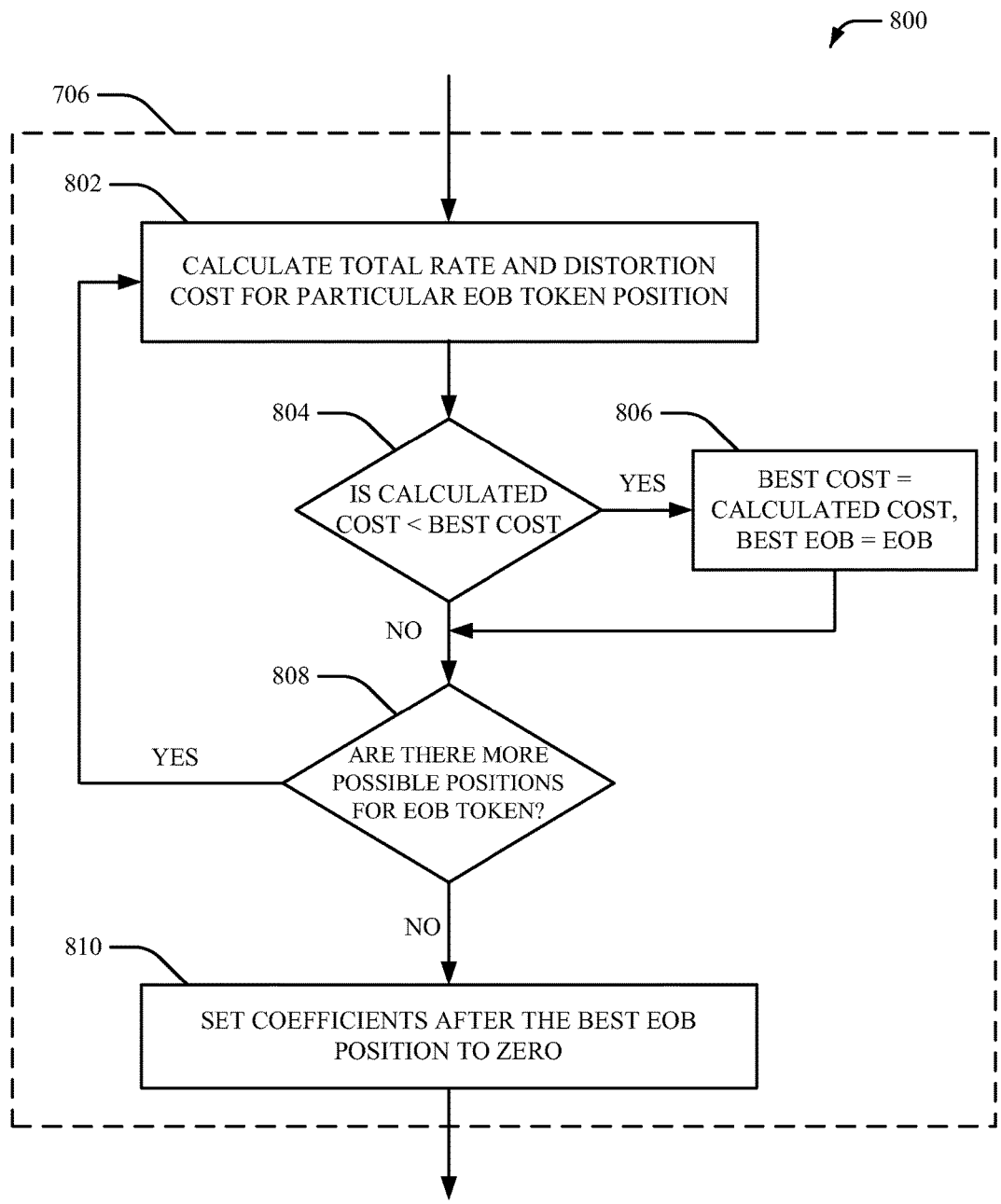
FIG. 8 depicts a flow diagram of an example method for determining a position for an end of block (EOB) token in an image block, in accordance with various aspects and implementations described herein.

Referring to FIG. 8, there illustrated is a methodology 800 for determining a best position for an EOB token. For example, the methodology 800 can provide further details for 706. At 802, total rate and distortion cost for a particular EOB token position can be calculated (e.g., using a computation component 106). For example, a cost for a candidate block with a particular EOB token location can be calculated based on a rate value and a distortion value of coefficients in the candidate block. At 804, it can be determined if the calculated cost is less than the best cost (e.g., using a selector component 108). For example, it can be determined if the calculated cost is better than a cost value of a previous candidate block. If yes, the methodology 800 can proceed to 806. If no, the methodology can proceed to 808. At 806, best cost can be set equal to the calculated cost and the best EOB position can be set equal to the current EOB position (e.g., using a selector component 108). For example, the current candidate block can be selected as the candidate block with the lowest cost and the best EOB position. Then, the methodology 800 can proceed to 808. At 808, it can be determined if there are more possible positions for an EOB token (e.g., using a selector component 108). For example, it can be determined if there are any other candidate blocks to be processed by the computation component 106 (e.g., to evaluate a cost value for a candidate block). If yes, the methodology can return to 802. If no, the methodology can proceed to 810. At 810, coefficients after the best EOB position can be set (e.g., using a selector component 108) to zero. For example, only coefficients before the best EOB position can undergo encoding (e.g., coefficients after the best EOB position can be erased).

Figure 9:
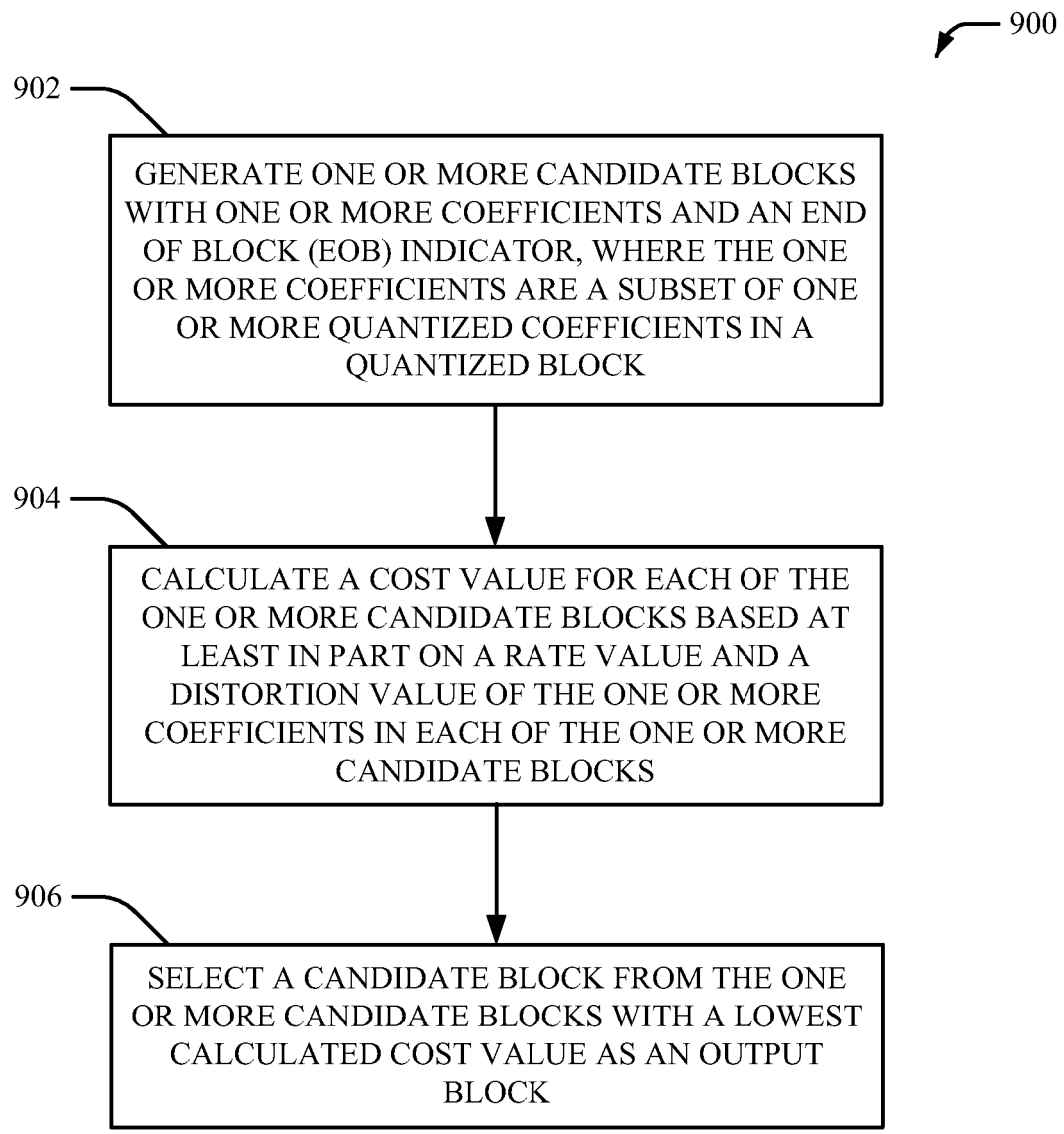
FIG. 9 depicts a flow diagram of an example method for selecting an output block from one or more candidate block, in accordance with various aspects and implementations described herein.

Referring to FIG. 9, there illustrated is a methodology 900 for selecting an output block from one or more candidate block. At 902, one or more candidate blocks with one or more coefficients and an end of block (EOB) indicator can be generated (e.g., using a candidate component 104). The one or more coefficients can be a subset of one or more quantized coefficients in a quantized block. For example, each of the one or more candidate blocks (e.g., potential output blocks) can include a different EOB indicator position. At 904, a cost value for each of the one or more candidate blocks can be calculated (e.g., using a computation component 106) based at least in part on a rate value and a distortion value of the one or more coefficients in each of the one or more candidate blocks. For example, a rate-distortion cost for each EOB indicator position in a candidate block can be calculated. At 906, a candidate block from the one or more candidate blocks with a lowest calculated value can be selected (e.g., using a selector component 108) as an output block. For example, a candidate block with a best EOB position can be selected.

Figure 10:
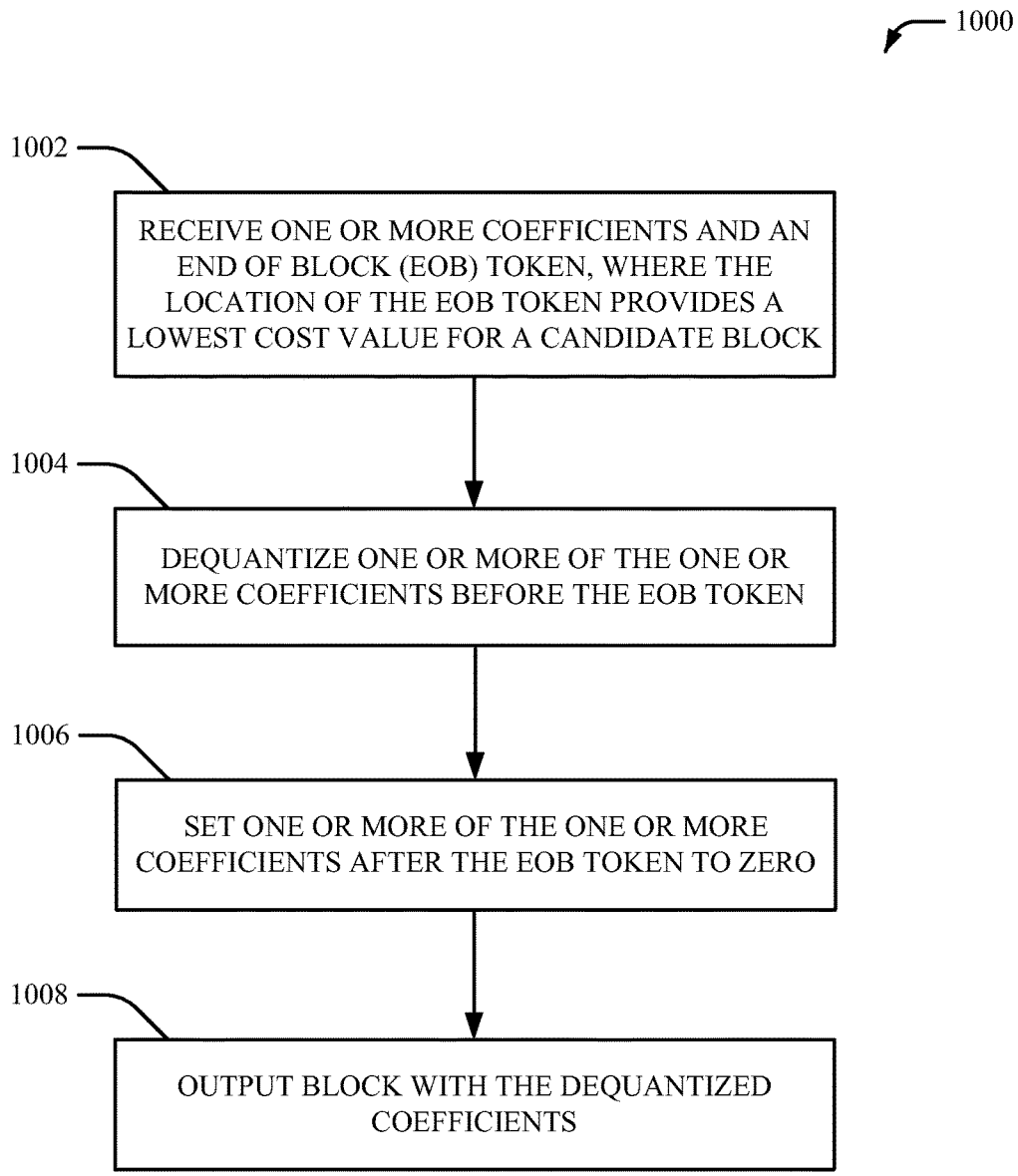
FIG. 10 depicts a flow diagram of an example method for dequantizing and outputting an image block, in accordance with various aspects and implementations described herein.

Referring to FIG. 10, there illustrated is a methodology 1000 for dequantizing and outputting an image block. At 1002, one or more coefficients and an end of block (EOB) token can be received (e.g., using a dequantization component 506). The location of the EOB token can provide a lowest cost value for a candidate block. For example, one or more quantized coefficients and an EOB token can be received from an encoder (e.g., an encoder component 102). The location of the EOB token within a candidate block can provide a lowest rate-distortion cost value for the candidate block. At 1104, one or more of the one or more coefficients before the EOB token can be dequantized (e.g., using a dequantization component 506). For example, one or more quantized coefficients before the EOB token can be dequantized (e.g., decoded). At 1006, one or more coefficients of the one or more coefficients after the EOB token can be set (e.g., using a dequantization component 506) to zero. For example, one or more quantized coefficients (e.g., all quantized coefficients) after the EOB token can be ignored. At 1008, a block with the dequantized coefficients can be outputted (e.g., using a dequantization component 506). For example, an output block can be generated with the dequantized coefficients.

Figure 11:
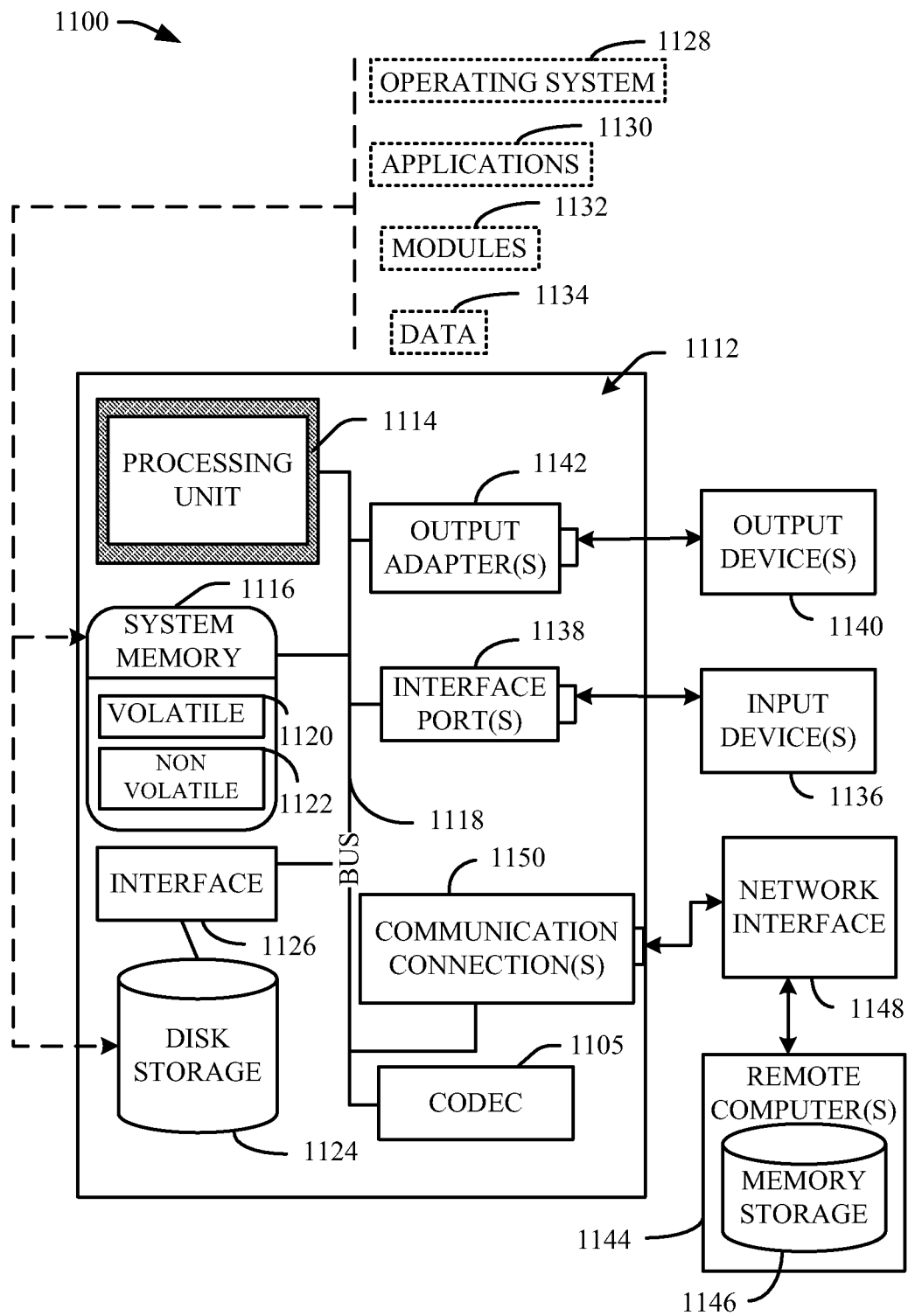
FIG. 11 is a schematic block diagram illustrating a suitable operating environment.
Figure 12:
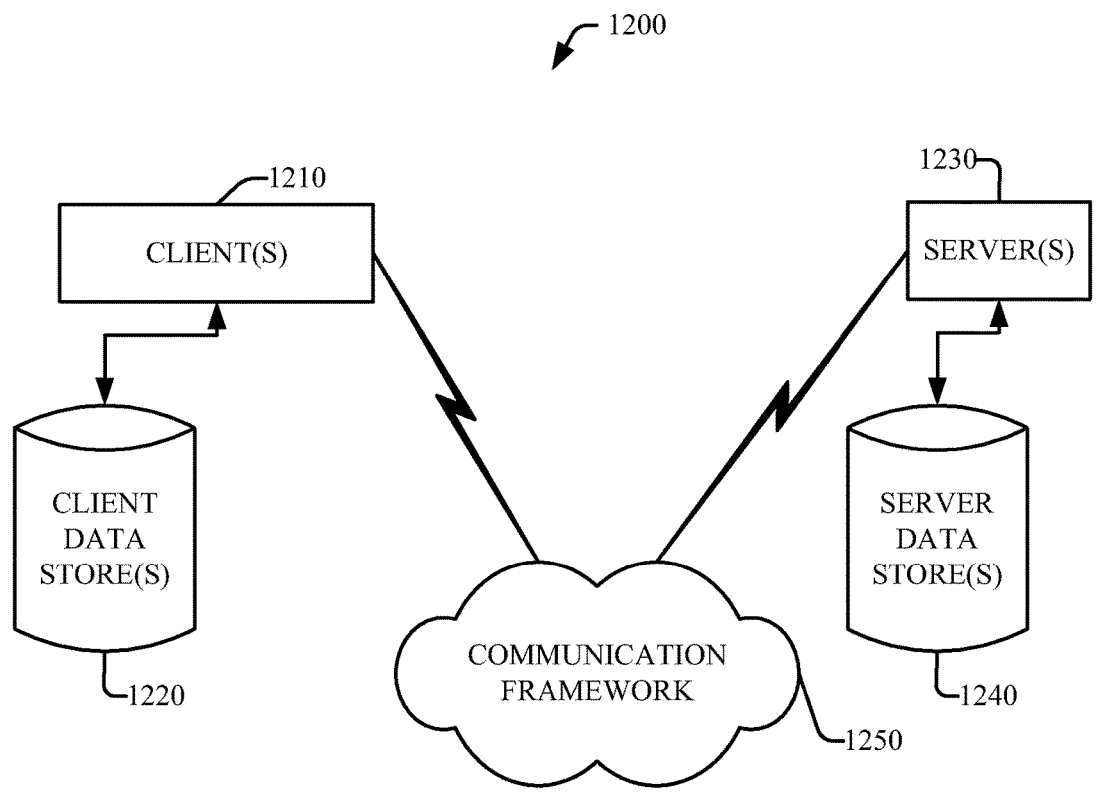
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 can include, but is not limited to, devices like a magnetic disk drive, floppy disk drive, flash drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

In accordance with various aspects and implementations, the computer 1112 can be used to encode data, such as digital media data, which can be in the form of a sequence of video frames (e.g., raw video frames). In some implementations, the computer 1112 can include a plurality of processors that can be used to process data and perform computing tasks (e.g., encoding-related tasks and/or decoding-related tasks, etc.). The computer 1112 includes a codec 1105 (e.g., a codec system 500) that can contain, for example, an encoder component and/or decoder component (e.g., the encoder component 102, the encoder 502 and/or the decoder 504), each of which can respectively function as more fully disclosed herein. In some implementations, the codec 1105 can perform various encoding tasks (e.g., generating motion estimations and motion vectors, encoding blocks and associated motion vectors, determining whether to reuse a prior encoded motion vector to encode a current block, identifying a coding mode associated with a current block, allocating bits for encoding of a current block, etc.) on data (e.g., sequentially or in parallel). In some implementations, the codec 1105 can perform various decoding tasks (e.g., decoding blocks and associated motion vectors, determining whether to reuse a prior decoded motion vector to decode a current block, identifying a coding mode associated with a current block, etc.) on data (e.g., sequentially or in parallel). The components of the codec 1105 can be implemented as hardware, software and/or firmware. For example, the codec 1105 can include one or more computer executable components. In one example, the computer 1112 and/or the codec 1105 can be implemented as an ASIC chip. In another example, the computer 1112 and/or the codec 1105 can be implemented as a SOC. It is to be appreciated that the computer 1112 can be used in connection with implementing one or more of the systems or components shown and described in connection with FIGS. 1-5.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes. The candidate component 104, the computation component 106 and the selector component 108 can be implemented as hardware and/or software on either a client 1210 or a server 1230.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; World-wide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, tablets), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "generate," "generating," or forms thereof may be or include forming, identifying or otherwise determining, as may be logical based on the particular description.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., encoder component, candidate component, computation component, selector component, quantization component, skip component, dequantization component, software component, rate table component, rate multiplier component, encoder, decoder, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    an encoder including or communicably coupled to a processor that executes the following computer executable components stored within a non-transitory storage device associated with the encoder:
    a candidate component that:
        generates a single quantized block of quantized coefficients using a single prediction mode for predicting a current block;
        generates a plurality of candidate blocks from the single quantized block, each candidate block having a defined location in a single scan order of the quantized coefficients in the single quantized block different from other candidate blocks of the plurality of candidate blocks, and each candidate block generated by:
            setting quantized coefficients in the candidate block to values equal to the quantized coefficients of the single quantized block at respective positions in the single quantized block up to the defined location of the candidate block in the single scan order,
            setting a value in the candidate block at the defined location to an end of block (EOB) indicator, and
            setting any quantized coefficients at positions beyond the defined location in the single scan order to zero, wherein one or more of the quantized coefficients of each candidate block is a subset of one or more of the quantized coefficients of the single quantized block; and
        includes the candidate block in the plurality of candidate blocks as generated;
    a computation component that calculates a cost value for each candidate block of the plurality of candidate blocks based at least in part on a rate value and a distortion value of the quantized coefficients in the candidate block; and
    a selector component that selects a single candidate block from the plurality of candidate blocks with a lowest calculated cost value as an output block for encoding the current block.

2. The system of claim 1, wherein the EOB indicator has a value of one.

3. The system of claim 1, wherein the EOB indicator is located after a non-zero quantized coefficient in each candidate block.

4. The system of claim 1, further comprising:
    the computation component calculates a cost value for the single quantized block based at least in part on a rate value and a distortion value of the set of quantized coefficients of the single quantized block.

5. The system of claim 4, further comprising:
    the selector component replaces the output block with the single quantized block in response to a determination that the cost value for the single quantized block is lower than a cost value of the single candidate block.

6. The system of claim 1, wherein the quantized coefficients in each candidate block other than the single quantized block include at least one less non-zero quantized coefficient than a number of non-zero quantized coefficients included in the quantized coefficients of the single quantized block.

7. The system of claim 1, wherein each candidate block is stored in one or more buffers.

8. The system of claim 1, wherein the selector component encodes one or more quantized coefficients preceding the EOB indicator in the output block.

9. The system of claim 1, wherein the single quantized block is a 4×4 block.

10. The system of claim 1, wherein the single quantized block is a set of quantized transform coefficients of pixels of the current block.

11. The system of claim 1, further comprising:
    a skip component that determines a skip cost value for not encoding a macroblock based at least in part on a cost value for each block in the macroblock.

12. The system of claim 11, wherein the skip component does not encode a macroblock in response to a determination that the skip cost value is smaller than a threshold level.

13. A method, comprising:
    generating a single quantized block for a current block predicted using a single prediction mode;
    generating, using a first component of an encoder pipeline, a plurality of candidate blocks from the single quantized block, each candidate block having quantized coefficients and an end of block (EOB) indicator, wherein the quantized coefficients are from a plurality of quantized coefficients of the single quantized block such that one or more of the quantized coefficients of each candidate block is a subset of the plurality of quantized coefficients of the single quantized block, and wherein each EOB indicator identifies a different position in each candidate block of the plurality of candidate blocks for a position of a last non-zero quantized coefficient such that each candidate block has a different number of non-zero quantized coefficients from the plurality of quantized coefficients of the single quantized block;

including the single quantized block as a candidate block within the plurality of candidate blocks;

calculating, using a second component of the encoder pipeline, a cost value for each candidate block based at least in part on a rate value and a distortion value of the quantized coefficients in the candidate block; and selecting, using a third component of the encoder pipeline, a single candidate block from the plurality of candidate blocks with a lowest calculated cost value as an output block for encoding the current block.

14. The method of claim 13, further comprising:

calculating a cost value for the single quantized block based at least in part on a rate value and a distortion value of the plurality of quantized coefficients of the single quantized block.

15. The method of claim 14, wherein selecting the single candidate block comprises:

replacing the output block with the single quantized block in response to a determination that the cost value for the single quantized block is lower than a cost value of the single candidate block.

16. The method of claim 13, further comprising:

encoding one or more coefficients preceding the EOB indicator in the output block.

17. The method of claim 13, further comprising:

setting one or more coefficients after the EOB indicator in the output block to zero.

18. The system of claim 1, wherein each candidate block has dimensions equal to the single quantized block generated using the single prediction mode for predicting the current block.

19. The method of claim 13, wherein each EOB indicator identifies the different position in each candidate block of the plurality of candidate blocks in a single scan order for the single quantized block.

* * * * *